(12) United States Patent
Fair

(10) Patent No.: US 7,873,963 B1
(45) Date of Patent: Jan. 18, 2011

(54) METHOD AND SYSTEM FOR DETECTING LANGUISHING MESSAGES

(75) Inventor: Robert L. Fair, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 1191 days.

(21) Appl. No.: 11/257,541

(22) Filed: Oct. 25, 2005

(51) Int. Cl.
*G06F 13/00* (2006.01)
*G06F 9/46* (2006.01)
*G06F 11/00* (2006.01)

(52) U.S. Cl. ............ 719/313; 718/104; 714/55; 711/100

(58) Field of Classification Search ............ 719/313; 718/104; 714/55; 711/100
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 6,128,657 A * | 10/2000 | Okanoya et al. | 709/224 |
| 6,249,807 B1 * | 6/2001 | Shaw et al. | 709/206 |
| 6,766,349 B1 * | 7/2004 | Belkin | 718/104 |
| 6,895,584 B1 * | 5/2005 | Belkin | 718/100 |
| 7,130,912 B2 * | 10/2006 | Nishikado et al. | 709/229 |
| 7,228,354 B2 * | 6/2007 | Chambliss et al. | 709/229 |
| 2006/0085361 A1 * | 4/2006 | Hoerle et al. | 705/75 |

OTHER PUBLICATIONS

"Microsoft Computer Dictionary", 2002, Microsoft Press, Fifth Edition, p. 499.*
Akyurek, Sedat, *Placing Replicated Data to Reduce Seek Delays*, Department of Computer Science, University of Maryland, UMIACS-TR-91-121, CS-TR-2746, Aug. 1991.
Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.

(Continued)

*Primary Examiner*—Qing Wu
(74) *Attorney, Agent, or Firm*—Cesari and McKenna, LLP

(57) ABSTRACT

Provided is a method and system for detecting languishing messages of a storage operating system. Requests to access or manipulate data are received as messages by the storage operating system. The messages are processed after the acquisition of resources. If the resources cannot be acquired, then the messages wait on data structures of the storage operating system. An independent thread of the storage operating system identifies messages that are languishing. Information related to the languishing message is recorded and actions to permit messages to continue waiting or cause storage operating system downtime result.

15 Claims, 5 Drawing Sheets

OTHER PUBLICATIONS

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063, Jun. 1987.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

* cited by examiner

METHOD AND SYSTEM FOR DETECTING LANGUISHING MESSAGES

TECHNICAL FIELD

Embodiments of the present invention relate to storage systems, and in particular, to processing messages within the storage operating system.

BACKGROUND

Processes of an operating system can communicate with one another by passing messages. In such a message passing system, processes communicate operations to one another that contain commands and data. Often, messages take the form of commands, i.e. operations that need to be executed by the operating system. Exemplary commands and data include "read(filename)" and "write(filename)." When a message includes a command to read a file having a particular file name, the operating system gathers resources, such as access to memory and access to disk drives, to perform the read operation. The event of resource gathering is called a "load" phase. Then, after the Load phase, a "modify" phase completes the read operation associated with the message. For the read operation, the modify phase completes the operation by providing the data to the requestor or returns an indication that the data could not be found.

However, during the load phase, the resources used to complete the operation associated with a message may not be available for some undesirable amount of time. Resource unavailability can occur because of resource contention, such as when other messages are busy being processed, or because of hardware failure. Specifically, if a resource is needed, such as access to memory, then a memory hardware problem may cause resource unavailability. Further, if a message is waiting for resources and cannot proceed to the modify phase, then the overall performance of the operating system may decrease. For example, if a requestor requests read access to a specific filename that is never provided because resources are not available during the load phase, then the lack of a response by the operating system to the requestor may cause dissatisfaction with the operating system. In yet another example, messages requiring responses in a fixed time period during the execution of a time critical application, such as a stock trading application, may cause dissatisfaction among the users of the stock trading application.

A solution to determine if messages are waiting for resources is to provide a list of waiting messages to requestors, e.g. if the requestor is an administrative user. For example, the operating system can provide the list of waiting messages when queried by the administrative user. However, such queries are not efficient during the real-time operation of the operating system because messages are rapidly processed. Specifically, a message may be waiting for a resource for five seconds, but the message may receive access to the resource in the sixth second. Thus, the administrative user checking the list of waiting messages every second is inefficient. Another solution is for the administrative user to offline the operating system and to implement a debugger to track waiting messages from inception to completion. However, this requires skill and knowledge of tracking messages to determine the cause of waiting messages while also causing operating system downtime.

Accordingly, what is needed is an automated system to proactively determine which messages are waiting for resources undesirable amounts of time during the real-time operation of the operating system while providing a method of mitigating delays caused by the waiting messages.

SUMMARY

Embodiments of the present invention provide a method and a system for detecting a languishing message. Messages are received by the operating system from a requestor, which may be a physical device that communicates with the operating system, or can be a process related to the operating system itself. Specifically, the physical device is an external requestor while a process related to the operating system is an internal requestor. Thus, messages can be internal messages and external messages. When a message waiting for a resource cannot obtain the resource because the resource is unavailable, the message "suspends." A suspended message is "restarted" when the resource becomes available. During a reasonable amount of time when an operation associated with the message is completed, the message may be restarted a number of times. Ideally, the message has no restarts. Of course, however, a message with many restarts without obtaining access to a needed resource, or an indefinitely suspended message with no restarts is a languishing message that is waiting an undesirable amount of time.

A languishing message is identified during a detection phase of an operating system process that scans lists of messages that have been suspended. Specifically, the messages may be suspended by the type of resources required by the messages. The identification of a suspended message as a languishing message occurs by an automatic, periodic examination of the timestamps related to the suspended message, against at least one threshold timestamp. After identifying languishing messages, one of multiple actions may be performed. For example, the information regarding a languishing message can be recorded in a log or a tracing facility used for debugging. Further, the action may be to terminate the real-time operation of the operating system, thereby resulting in a system panic. It should be appreciated that the present invention can be implemented in numerous ways, such as a process, an apparatus, a system, a device, a method on a computer readable medium, or by logic implemented by hardware or software. Several inventive embodiments of the present invention are described below.

In one embodiment, a method for processing messages during real-time operation of a storage system includes receiving a message at the storage system. The message is capable of being stored in at least one of multiple message lists. The embodiment further includes initiating processing of the received message by the storage system. The embodiment of the method also includes gathering at least one of a plurality of resources managed by the storage system, where the resource permits the continued processing of the message. The embodiment includes identifying a languishing message that is the message that is not capable of continued processing.

In an embodiment of a system, the system includes a processor that is configured to execute a process. The process is capable of identifying a languishing message during the real-time operation of the system. The system also includes a memory module that is configured to store information regarding the identified languishing message.

In yet another embodiment of a storage system that is configured to process messages, the storage system includes a memory module. The memory module is configured to store messages during real-time operation of the storage system. Further, the embodiment includes means for identifying a languishing message, where the languishing message is a message that is incapable of continued processing.

In an embodiment of a computer readable media that contains instructions for execution on a processor for the practice of a method for processing messages, the method includes receiving a message at the storage system. The message is capable of being stored in at least one of multiple message lists. The embodiment includes initiating processing of the received message by the storage system and gathering at least one of multiple resources managed by the storage system. The resource permits the continued processing of the message. Further, the embodiment includes identifying a languishing message that is the message that is not capable of continued processing.

Other aspects of the invention will become apparent from the following detailed description taken in conjunction with the accompanying drawings, which illustrates by way of example, the principles of the invention.

DETAILED DESCRIPTION

In a message passing system implemented by an operating system of a computer system, requestors transmit messages to the operating system. Messages are received by the operating system from a requestor, which may be a physical device that communicates with the operating system, or can be a process related to the operating system itself. Specifically, the physical device is an external requestor while a process related to the operating system is an internal requestor. Thus, messages can be internal messages and external messages. The operating system processes the messages to completion by responding to data manipulation requests and service requests. Exemplary data manipulation requests include copy, read, and write operations. Further, exemplary service requests include the allocation of storage locations to store data, such as the creation of a directory, or changing the ownership of a directory.

Specifically, messages received by the operating system are completed after the execution of a resource gathering phase and a completion phase. If the message cannot gather resources, then the message suspends and is temporarily stored on message suspend lists. The operating system continues processing the temporarily stored message when a resource is available. However, a message that continuously suspends or is not processed to completion is a languishing message. Thus, the languishing message is not capable of continued processing by the operating system.

In embodiments of the present invention, logic of the operating system periodically reviews the message suspend lists to identify languishing messages. Such logic may be implemented by hardware, firmware, software, or a combination thereof. If messages are languishing, then the process initiates actions, such as recording information related to the languishing message or causing an operating system panic, which ceases requestor access to the operating system. In the following description, it will be obvious to one skilled in the art, that well known process operations have not been described in detail in order not to unnecessarily obscure the embodiments of the present invention described herein.

Storage System

Figure 1:
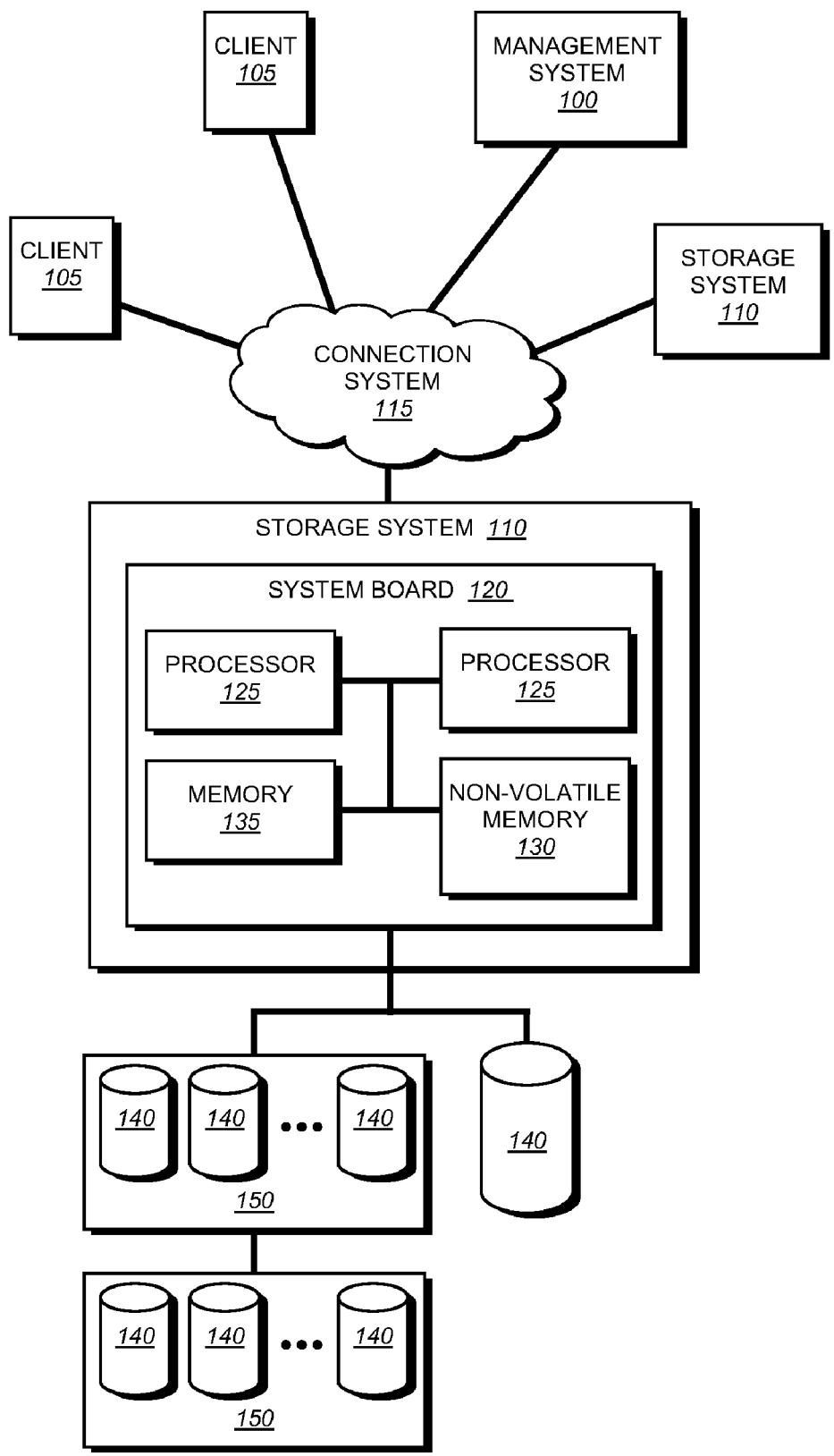
FIG. 1 is a diagram illustrating a storage system capable of receiving messages, in accordance with an embodiment of the invention.

In an exemplary embodiment illustrated by FIG. 1, a storage system 110 is capable of receiving messages from a client 105 via a connection system 115. The client 105 may be a general-purpose computer configured to execute applications. Moreover, the client 105 may interact with the storage system 110 in accordance with a client/server model of information delivery. That is, the client 105 may request the services of the storage system 110, and the storage system 110 may return the results of the services requested by the client 105, by exchanging packets over the connection system 115. The clients 105 may issue packets conforming to file-based access protocols, such as the Common Internet File System (CIFS) protocol or Network File System (NFS) protocol, over Transmission Control Protocol/Internet Protocol (TCP/IP) when accessing information in the form of files and directories. Alternatively, the client 105 may issue packets conforming to block-based access protocols, such as the Small Computer Systems Interface (SCSI) protocol encapsulated over TCP (iSCSI) and SCSI encapsulated over Fibre Channel (FCP), when accessing information in the form of blocks. However, it should be appreciated that a clustered computing environment implemented by computing devices that are "peers" in a peer-to-peer network or in a grid are also expressly contemplated by other exemplary embodiments of the present invention.

The storage system 110 comprises one or more storage devices into which information may be entered, and from which information may be obtained, as desired. The storage devices include disk drives 140 organized as a disk array 150, or as a standalone disk drive 140, wherein the term "disk" commonly describes a self-contained rotating magnetic media storage device. The term disk in this context is synonymous with hard disk drive (HDD) or direct access storage device (DASD). Further, the storage system 110 may be implemented in accordance with a variety of storage architectures including, but not limited to, a network-attached storage environment, a storage area network and a disk assembly directly attached to a client or host computer.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 110. An example of a multi-protocol storage appliance that may be advantageously used with the present invention is commercially available from Network Appliance, Inc. of Sunnyvale, Calif. Thus, the term "storage system" should therefore be taken broadly to include such arrangements in addition to any subsystems configured to perform a storage function and associated with other equipment or systems.

Storage of information on the disk array 150 is preferably implemented as one or more storage volumes of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data stripes across a given number of physical disks in the RAID group, and the appropriate storing of redundant information (parity) with respect to the striped data. The physical disks of each RAID group may include disks configured to store striped data (i.e., data disks) and disks configure to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks* (*RAID*), by D. A. Patterson, G. A. Gibson and R. H. Katz, Proceedings of the International Conference on Management of Data (SIGMOD), June 1988.

The storage system 110 includes a system board 120 that comprises a portion of the hardware components of the storage system 110. It should be appreciated that the storage system 110 includes other components (not shown), such as a power supply and adapters. For example, the adapters enable communication with the clients 105 and other devices, such as other storage systems 110 and a management system 100, over the connection system 115. Specifically, a network adapter (not shown) comprises the mechanical, electrical and signaling circuitry needed to connect the storage system 110 to a client 105 over the connection system 115.

In exemplary embodiments, the management system 100 can be a separate device that provides administrative control of the storage system 110. Alternatively, the management system 100 may be connected directly to the storage system 110, such as over a serial interface, SCSI, or the like. In yet other embodiments, the management system 100 is software code operating on the storage system 110, thus not requiring a separate device. The management system 100 operates to provide access to a system log by an administrative user. The system log, which is populated by information regarding languishing messages will be further described below with respect to FIG. 4B.

In certain embodiments, a second storage system is operatively interconnected with the connection system 115. The second storage system may be configured as a near line storage server. Specifically, a near line storage server is a computer adapted to be utilized for backup file service operations. A near line server stores a secondary image of data to be utilized in the event of a failure of a primary storage system. The second storage system generally comprises hardware similar to the storage system 110; however, it may alternatively execute a modified storage operating system that adapts the storage system for use as a near line storage server. In alternate embodiments, there may be a plurality of additional storage systems in the computing environment herein described. Further, the storage operating system herein described is purely exemplary and other operating systems implemented in other embodiments of the present invention are possible, as long as the operating system can detect languishing messages.

Further, storage adapters (not shown) enable communication with the storage devices via a communication bus (not shown) of the storage system 110. For example, the storage adapter cooperates with the storage operating system executing on the storage system 110 to access information requested by a client 105. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disk drives 140, such as HDD and/or DASD, of disk array 150. The storage adapter includes input/output (I/O) interface circuitry that couples to the disks over an I/O interconnect arrangement, such as a conventional high-performance, Fibre Channel serial link topology.

The connection system 115 is well known to those of ordinary skill in the art, such as technologies used for wireless and wire-based communications. For example, the connection system 115 may be a Fibre Channel network or an Ethernet network, which comprise a point-to-point connection or a shared medium, such as a local area network (LAN) or wide area network (WAN). The client 105 may communicate with the storage system 110 over the network by exchanging discrete frames or packets of data according to pre-defined protocols, such as TCP/IP.

FIG. 1 also illustrates the system board 120, which includes at least one processor 125, non-volatile memory 130, and memory 135. The processor 125 executes instructions and other software program code, such as those associated with processing messages of the storage operating system. In embodiments of the invention contemplated herein, any suitable processor 125 is possible for use by the system board 120, as long as the processor 125 is capable of executing instructions and other software program code.

Non-volatile memory 130 comprises storage locations that can store instructions and other information, as long as the non-volatile memory 130 has adequate power to enable the retention of the information during a powered-off state of the storage system 110. By retaining the information during a powered-off state, the information is accessible by the storage system 110 after entering a power-on state. It should be appreciated that methods of maintaining power in the non-volatile memory 130 is accomplished by a battery or the like.

The memory 135 comprises storage locations that are addressable by the processor 125 and adapters. A portion of the memory 135 may be further organized as a buffer cache for storing certain data structures associated with embodiments of the present invention. The processor 125 and adapters may, in turn, comprise processing elements and/or logic circuitry configured to execute software code and manipulate the data structures. The storage operating system, portions of which are resident in memory 135 and executed by the processing elements, functionally organizes the storage system 110 by, inter alia, invoking storage operations executed by the storage system 110. It will be apparent to those skilled in the art that other processing and memory means, including various computer readable media, may be used for storing and executing program instructions pertaining to the inventive technique described herein. Thus, the processor 125 can execute software code associated with processing messages. For example, languishing messages that are identified during the real-time operation of the storage system 110 can be processed by the storage operating system according to the embodiments hereinafter described to enable the storage system 110 to process requests from clients 105 in a desirable amount of time. For example, if a request is known to complete within 10 seconds, on average, a request that has not been completed after 15 seconds may be undesirable.

Figure 2:
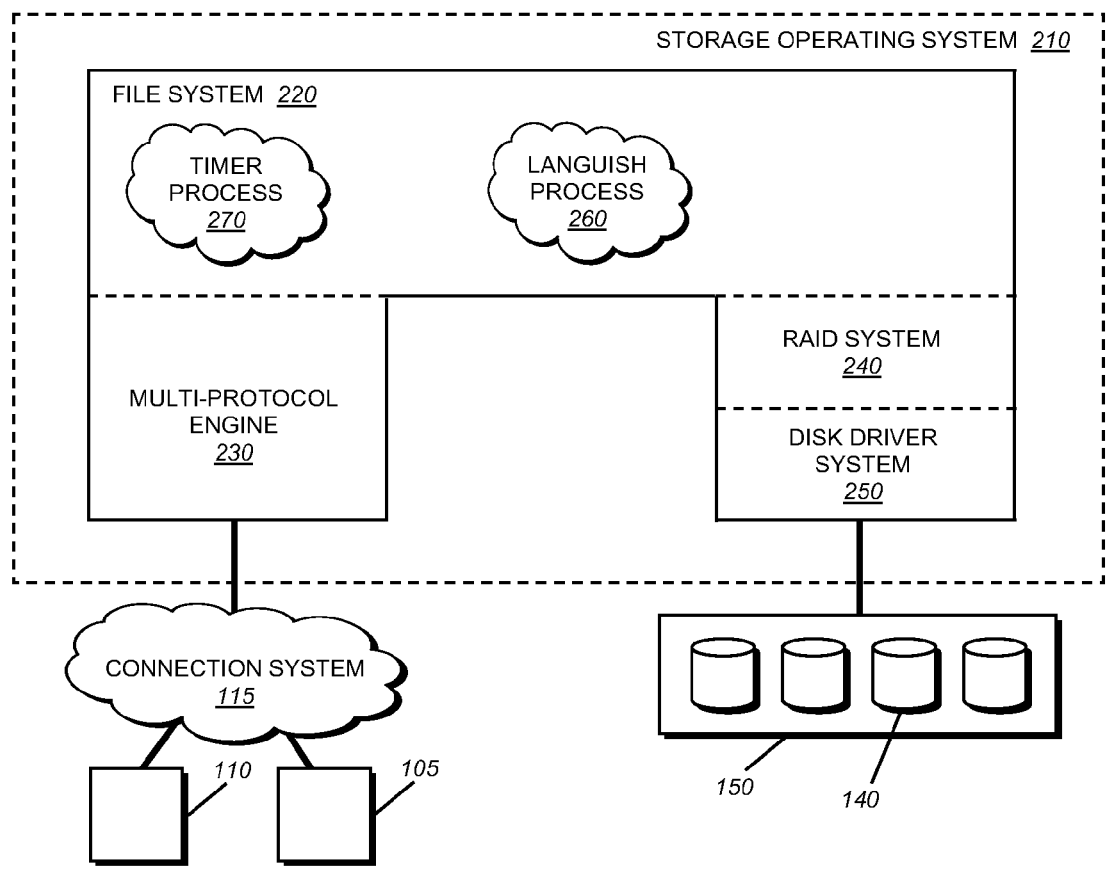
FIG. 2 is a diagram illustrating a storage operating system for processing messages, in accordance with an embodiment of the invention.

FIG. 2 is a diagram illustrating a storage operating system 210 for processing messages, in accordance with an embodiment of the invention. The storage operating system 210 preferably implements a high-level module, such as a file system 220, to logically organize information as a hierarchical file system structures of directories, files and special types of files called virtual disks (hereinafter "blocks") on the disk drives 140 (disks). For example, to facilitate access to the disks 140, the storage operating system 210 implements a write-anywhere file system that cooperates with virtualization modules to virtualize the storage space provided by disks 140. The file system 220 logically organizes the information as a hierarchical structure of named directories and files on the disks 140. Each on-disk file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In an illustrative embodiment, the storage operating system 210 is preferably the NetApp® Data ONTAP® operating system available from Network Appliance, Inc., of Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable to perform a storage function in the storage system 110, e.g., that manages data access and may, in the case of a file server, implement file system semantics. In this sense, the Data ONTAP software is an example of such a storage operating system implemented as a microkernel and including the WAFL layer to implement the WAFL file system semantics and manage data access. The storage operating system 210 can also be implemented as an application program operating over a general-purpose operating system, such as UNIX® or Windows XP, or as a general-purpose operating system with configurable functionality, which is configured for storage applications as described herein.

Storage of information on the disk array 150 is preferably implemented as one or more storage "volumes" that comprise a collection of disks 140 cooperating to define an overall logical arrangement of volume block number (vbn) space on the volume(s). Each logical volume is a resource that is generally, although not necessarily, associated with its own file system. The disks 140 within a logical volume/file system are typically organized as one or more groups, wherein each group may be operated as a Redundant Array of Independent (or Inexpensive) Disks (RAID). Most RAID implementations, such as an exemplary RAID-4 level implementation illustrated in FIG. 2 as RAID system 240, enhance the reliability/integrity of data storage through the redundant writing of data stripes across a given number of physical disks in the RAID group, and the appropriate storing of parity information with respect to the striped data. Although an illustrative example of a RAID implementation is a RAID-4 level implementation, it should be understood that other types and levels of RAID implementations may be used in accordance with the inventive principles described herein.

FIG. 2 is a schematic block diagram of the storage operating system 210 that may be advantageously used with the present invention. The storage operating system 210 comprises a series of software layers (not shown) organized to form an integrated network protocol stack or, more generally, a multi-protocol engine 230 that provides data paths for clients 105 to access information stored on the storage system 110 using block and file access protocols. The protocol stack includes a media access layer of network drivers (e.g., gigabit Ethernet drivers) that interfaces to network protocol layers, such as the IP layer and its supporting transport mechanisms, the TCP layer and the User Datagram Protocol (UDP) layer. A file system protocol layer provides multi-protocol file access and, to that end, includes support for the Direct Access File System (DAFS) protocol, the NFS protocol, the CIFS protocol and the Hypertext Transfer Protocol (HTTP) protocol. A VI layer implements the VI architecture to provide direct access transport (DAT) capabilities, such as RDMA, as required by the DAFS protocol.

The multi-protocol engine 230 also includes an iSCSI driver layer that provides block protocol access over the TCP/IP network protocol layers, while a FC driver layer receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system 210 includes a storage module embodied as the RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by the file system 220 interacting with virtualization modules embodied as, e.g., a vdisk module and a SCSI target module (not shown). The vdisk module is layered on the file system 220 to enable access by administrative interfaces, such as a user interface (UI), in response to a user (such as a system administrator) issuing commands to the storage system 110. The SCSI target module is disposed between the FC and iSCSI drivers and the file system 220 to provide a translation layer of the virtualization system between the block (lun) space and the file system space, where luns are represented as blocks. The UI is disposed over the storage operating system 210 in a manner that enables administrative or user access to the various layers and systems.

The file system 220 is illustratively a message-based system that provides logical volume management capabilities to access information stored on the storage devices, such as the disk array 150. That is, in addition to providing file system semantics, the file system 220 provides functions normally associated with a volume manager. These functions include (i) aggregation of the disks 140, (ii) aggregation of storage bandwidth of the disks 140, and (iii) reliability guarantees, such as mirroring and/or parity (RAID). The file system 220 illustratively implements the WAFL file system having an on-disk format representation that is block-based using, e.g., 4 kilobyte (kB) blocks and using index nodes ("inodes") to identify files and file attributes (such as creation time, access permissions, size and block location). Further, the file system 220 uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system 220 and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 105 is forwarded as a packet over the connection system 115 and onto the storage system 110 where it is received at a network adapter. A network driver of the multi-protocol engine 230 processes the packet and, if appropriate, passes it on to a network protocol and file access layer (also of the multi-protocol engine 230) for additional processing prior to forwarding to the file system 220. Here, the file system generates operations to load (retrieve) the requested data from the disk array 150 if it is not resident "in core", i.e., memory 135. If the information is not in the memory 135, the file system 220 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 140 and loads the requested data block(s) in the buffer cache for processing by the storage system 110. Upon completion of the request, the storage system 110 (and operating system) returns a reply to the client 105 over the connection system 115.

It should be further noted that the software path through the storage operating system layers described above to perform data storage access may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 110 in response to a request issued by the client 105. Moreover, in another alternate embodiment of the invention, the processing elements of adapters of the storage system 110 may be configured to offload some or all of the packet processing and storage access operations, respectively, from processor 125, to thereby increase the performance of the storage service provided by the system. It is expressly contemplated that the various processes, architectures and procedures described herein can be implemented in hardware, firmware or software.

According to the "write anywhere" nature of the file system 220, resources such as blocks, may be located anywhere on the disks 140. A file system layout is provided that apportions an underlying physical volume into one or more virtual volumes (vvols) of a storage system. If a data block is retrieved (read) from disk 140 into the memory 135 of the storage system 110 and "dirtied" (i.e., updated or modified) with new data, the data block is thereafter stored (written) to a new location on the disk 140 to optimize write performance. A write-anywhere file system may also opt to maintain a near optimal layout such that the data is substantially contiguously arranged on disks 140. The optimal disk layout results in efficient access operations, particularly for sequential read operations, directed to the disks.

The storage operating system 110 may further implement a storage module, such as the RAID system 240 that manages the storage and retrieval of the information to and from the disks in accordance with input/output (I/O) operations. The RAID system 240 is also a resource that is also responsible for parity operations in the storage system 110. Note that the file system only "sees" the data disks within its vbn space; the parity disks are hidden from the file system 220 and, thus, are only visible to the RAID system 240. The RAID system 240 typically organizes the RAID groups into one large physical disk (i.e., a physical volume), such that the disk blocks are concatenated across all disks of all RAID groups. The logical volume maintained by the file system is then "disposed over" (spread over) the physical volume maintained by the RAID system 240.

The RAID system 240 maintains information about the geometry of the underlying physical disks (e.g., the number of blocks in each disk) in raid labels stored on the disks. The RAID system 240 provides the disk geometry information to the file system for use when creating and maintaining the vbn-to-disk, dbn mappings used to perform write allocation operations and to translate vbns to disk locations for read operations. Resources such as block allocation data structures include an active map, a snapmap, a space map and a summary map. These resources are data structures that describe block usage within the file system, such as the write-anywhere file system. It should be appreciated that these mapping data structures are independent of the geometry and are used by a write allocator of the file system as existing infrastructure for the logical volume.

The write-anywhere file system performs write allocation of blocks in a logical volume in response to an event in the file system 220 (e.g., dirtying of the blocks in a file). When write allocating, the file system 220 uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially lay down a plurality of stripes per RAID group. In particular, the file system chooses vbns that are on the same stripe per RAID group during write allocation using the vbn-to-disk, dbn mappings.

During storage system operation, a volume (or other data container, such as a file or directory) may become corrupted due to, e.g., physical damage to the underlying storage devices, software errors in the storage operating system executing on the storage system or an improperly executing application program that modifies data in the volume. In such situations, an administrator may want to ensure that the volume is promptly mounted and exported so that it is accessible to clients as quickly as possible; this requires that the data in the volume (which may be substantial) be recovered as soon as possible. Often, the data in the volume may be recovered by, e.g., reconstructing the data using stored parity information if the storage devices are utilized in a RAID configuration. Here, reconstruction may occur on-the-fly, or during the real-time operation of the storage system 110, resulting in virtually no discernable time where the data is not accessible.

In other situations, reconstruction of the data may not be possible. As a result, the administrator has several options, one of which is to initiate a direct copy of the volume from a point-in-time image stored on another storage system. In the general case, all volume data and meta data must be copied, prior to resuming normal operations, as a guarantee of application consistency. The time taken to complete a full copy of the data is often extremely costly in terms of lost opportunity to run business-critical applications. However, such brute force data copying is generally inefficient, as the time required to transfer substantial amounts of data, e.g., terabytes, may be on the order of days. Similar disadvantages are associated with restoring data from a tape device or other offline data storage The underlying physical volume is an aggregate comprising one or more groups of disks, such as RAID groups, of the storage system 110. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

In one embodiment, pvbns are used as block pointers within buffer trees of files stored in a vvol. This "hybrid" vvol embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding Mode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk, dbn occurs at the file system/RAID system boundary of the storage operating system 210.

Broadly stated, block allocation proceeds in parallel on the flexible vvol and aggregate when write allocating a block within the vvol, with a write allocator process selecting an actual pvbn in the aggregate and a vvbn in the vvol. The write allocator adjusts block allocation bitmap structures, such an active map and space map, of the aggregate to record the selected pvbn and adjusts similar structures of the vvol to record the selected vvbn. A vvid of the vvol and the vvbn are inserted into an owner map of the aggregate at an entry defined by the selected pvbn. The selected pvbn is also inserted into a container map (not shown) of the destination vvol. Finally, an indirect block or Mode file parent of the allocated block is updated with one or more block pointers to the allocated block. The content of the update operation depends on the vvol embodiment. For a dual vbn hybrid vvol embodiment, both the pvbn and vvbn are inserted in the indirect block or Mode as block pointers.

Detection of Languishing Messages

In exemplary embodiments of the present invention, the file system 220 includes a languish process 260 and possibly a timer process 270. The languish process 260 and the timer process 270 are processes implemented by the file system 220 to determine whether a message is languishing. In an exemplary embodiment, the processes are implemented as computer instructions that are executable by the processor 125 of the storage system 110. The processes execute in memory 135 and can operate independently of other processes operating in the storage operating system 210. For example, the languish process 260 can be a thread that starts when the storage operating system 210 is ready to accept messages from requestors. This is considered the uptime, real-time operation, or runtime phase of the storage operating system 210. Alternatively, downtime of the storage operating system 210 is when the storage operating system cannot accept messages for processing. The languish process 260 executes during uptime to examine various data structures for languishing messages, as will be further described with respect to FIG. 3.

Similar to the languish process 260, the timer process 270, which is a file system process, operates during uptime and timestamps the message when the message is received by the storage operating system 210. It should be appreciated that in exemplary embodiments of the present invention, a separate timer process 270 is not required to timestamp the message. For example, existing file system mechanisms such as function calls, which are generally employed by operating systems, can timestamp a message. Thus, any suitable method of timestamping a message is possible, as long as the timestamp indicates the receipt time of the message by the storage operating system 210.

In an exemplary embodiment of the present invention, a message from a requestor to read a file is received by the storage operating system 210 at time T0. The requestor may be a physical device that communicates with the storage operating system, or can be a process related to the storage operating system itself. Specifically, the physical device is an external requestor while a process related to the storage operating system is an internal requestor. Thus, messages can be internal messages and external messages. Further, internal messages can be generated as background processes of the storage operating system and external messages can be generated by clients (e.g. as illustrated with respect to FIG. 1) as foreground processes. By classifying messages as internal messages and external messages, the classification can be one of multiple types of messages. In exemplary embodiments of the present invention, another message type includes determining if the message is a read operation, write operation, or other operation. Further, another message type is the classification of the message according to the resources the message requires during the load phase.

At time T1, which could be 10 seconds after the receipt of the message, the languish process 260 determines if the message is languishing. In an exemplary embodiment, the message is languishing if the elapsed time is 15 seconds. Thus, the message at time T1 is not languishing. However at time T2, which could be 20 seconds after receipt of the message, the message is languishing if the message is not completed. It should be appreciated the time values can vary and that other time values are possible. For example, 30 seconds may be a time threshold whereby a message is considered to be languishing. Alternatively, in other embodiments, a message that is not processed under 1 second time threshold may be languishing.

Threshold times can be configured before the startup of the storage operating system 210. For example, during a pre-runtime phase, which occurs before the real-time operation of the storage system 110, various thresholds can be configured for use by the languish process 260. The thresholds can be selected by an administrative user and entered via a management system 100. For example, if the administrative use is aware that particular messages are known to suspend for 20 seconds, then setting first threshold at 30 seconds may be appropriate. Further, if the administrative user is aware that on average, most messages related to read commands are known to suspend for 5 seconds, then a second threshold can be set to 10 seconds.

Other than configuring threshold times, in yet other exemplary embodiments of the present invention, the languish process 260 can be set by the administrative user to via the management system 100 to periodically scan messages to identify languishing messages. For example, during the pre-runtime phase, the periodicity of the scan can be configured according to the knowledge of the administrative user that the storage operating system 210 should not execute the languish process 260 more than twice an hour because of the undesirable consumption of computing cycles of the processor 125. In yet other embodiments, the periodicity of the languish process 260 can be configured to one minute, thus causing the languish process 260 to scan for languishing messages every minute.

In other exemplary embodiments, the timer process 270 can operate in conjunction with other processes that apply other metrics. For example, a knowledge base of messages including average completing times can be compared with the elapsed time determined by the timer process 270. Comparing the elapsed time with average message completing times can be used by the languish process 260 to identify languishing messages. Suitable knowledge bases can exist on the storage system 110, or some other system accessible via the connection system 115. The knowledge base can be further used by the administrative user to configure threshold times and periodicity of execution of the languish process 260. Alternatively, as further described below, information such as message completion times can be associated with the message.

Figure 3:
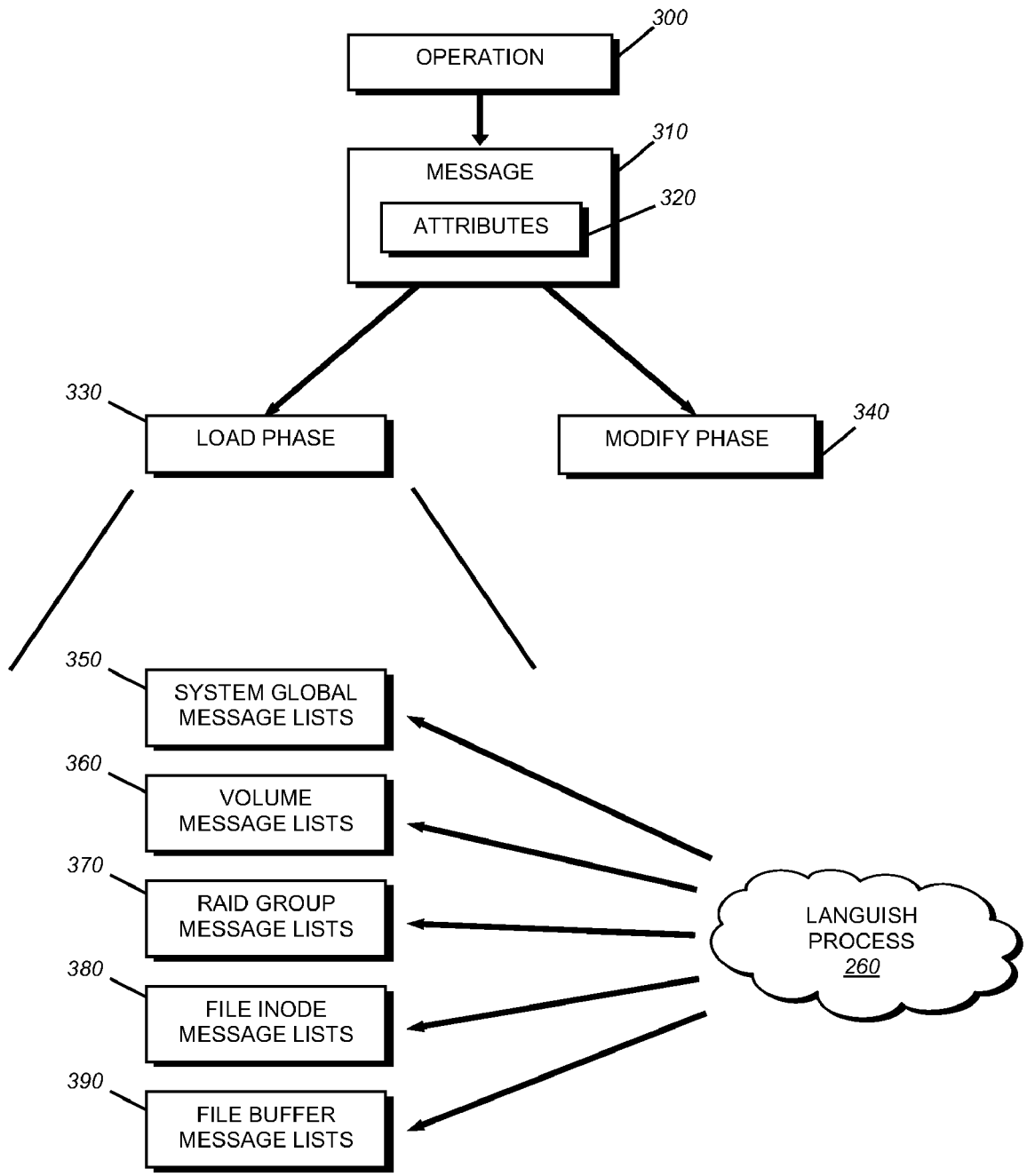
FIG. 3 is a diagram illustrating the processing of messages by the storage operating system, in accordance with an embodiment of the invention.

FIG. 3 is a diagram illustrating the processing of messages by the storage operating system, in accordance with an embodiment of the invention. In exemplary embodiments, an operation 300, such as a read operation or a write operation, is transmitted as a message to the storage operating system 210 from a client 105. The message 310 includes attributes 320 that include information such as the length of time the message may take to complete. For example, the languish process 260 may be configured during the startup of the storage system 110 to identify languishing messages every 10 seconds. If the message 310 is a write operation that is completed in 30 seconds, then the languish process 260 can ignore the message if it has suspended because the languish process 260 can identify via the attributes 320 of the message 310 that the message is only in danger of languishing after 30 seconds, e.g. 40 seconds.

In exemplary embodiments, the attributes 320 can be implemented as a bitmap containing flags that provide information about the message 310. If the message 310 is an internal message, the initiating process provides the information about the message 310. Alternatively, if the message 310 is an external message, the originating device can provide the information. Exemplary information can be classified as last known completion time, average completion time, messages that exceed certain thresholds, or that the message type is known to suspend frequently because of the difficulty of obtaining a resource.

As further illustrated by FIG. 3, the message 310 enters a load phase 330 or a modify phase 340. The load phase 330 occurs when the storage operating system 210 attempts to gather resources, such as access to a disk in order to complete the message 310. For example, during a write operation, resource gathering during the load phase 330 involves obtaining access to blocks used to write data. Other resources include available memory locks, indirect blocks of large files, directory entries, etc. Obtaining access to the blocks or other resources includes mechanisms well known to those in the art. For example, locks can be employed by the storage operating system 210 to allow access to the blocks by a first write operation, but disallow access to the same blocks by a second write operation executing concurrently. During the load phase 330, the message 310 can be stored on a list. It should be appreciated that although an exemplary embodiment of the list is a queue, other suitable data structures are possible, as long as the data structure permits the temporary storage of the message 310 for the identification of languishing messages. Exemplary data structures include system global message lists 350, volume message lists 360, RAID group message lists 370, a file inode message list 380, and a file buffer message list 390. Further, the data structures may be implemented dynamically or statically as queues, stacks, or the like. The data structures permit a message to wait for a resource until the resource becomes available. For example, if the storage operating system 210 is short of usable memory, the message waiting for memory can wait on a global message list 370. Similarly, messages that require access to a volume waits on a volume message list 360, etc.

When a write operation is received by the storage operating system 210, the message 310 transmitted by the requestor is timestamped by the timer process 270 and enters the load phase 330. If a resource cannot be gathered, or "loaded," then the message 310 is stored on a list, i.e. "suspended" or designated as "suspended." Once the resource is available, the message 310 is "restarted" and may enter the modify phase 340 if all needed resources are gathered to complete the write operation. However, if the resources are not gathered, then the message waits on at least one suspend list. Periodically, during the uptime of the storage operating system 210, the languish process 260 checks the suspend list to find languishing messages. For example, the languish process 260 can be configured to always check the system global message lists 350, volume message lists 360, and RAID group message lists 370 for languishing messages every 20 seconds. Alternatively, the languish process 260 may or may not be configured to check the file inode message list 380 and the file buffer message list 390.

It should be appreciated that the storage operating system 210 may include many lists, e.g., thousands of lists. Thus, the languish process 260 may be configured to optimize the performance of the storage system 110 by checking groups, or subsets of lists. Specifically, if the languish process 260 impacts the performance of the storage operating system 210 such that users are unsatisfied with the time to process requests, then the languish process 260 can be configured to check less lists. Alternatively, more lists can be checked to identify more languishing messages. The configuration of the languish process 260 may be performed by a user having administrative privileges on the storage operating system 210.

Using the exemplary write operation described above, resources, such as indirect and direct blocks are gathered to write data during the modify phase 340. Further, during the modify phase 340, the storage operating system 210 uses a tree structure loaded into memory, such as the non-volatile memory 130. Indirect blocks and direct blocks are structured in the tree structure and collected with other blocks in memory. Thereafter, a confirmation that the write operation completed is transmitted by the storage operating system 210 to the requestor of the write operation. Finally, during a consistency point, i.e. a point in time during the uptime of the storage operating system 210, the blocks are written to the disk arrays 150.

Figure 4A:
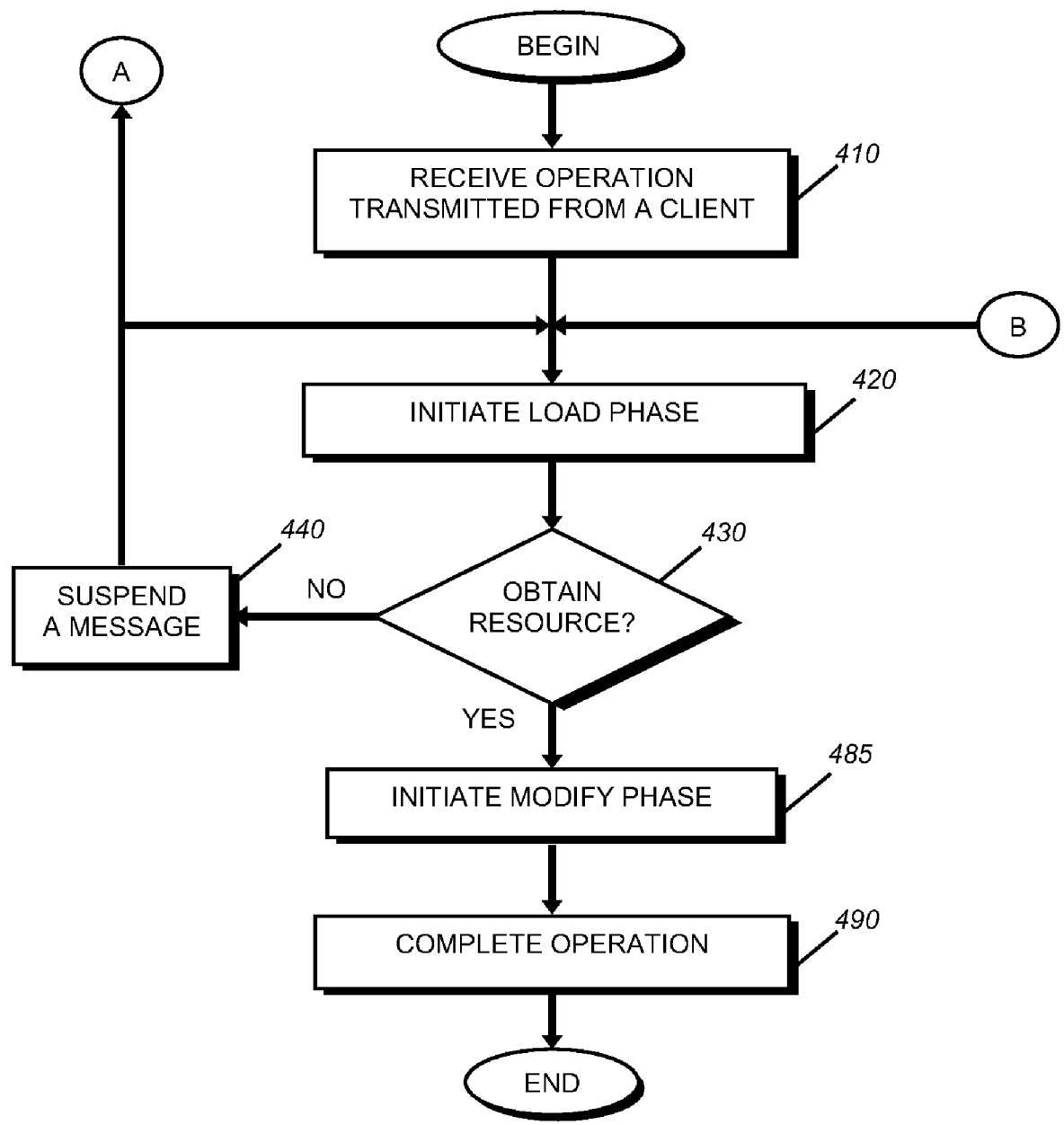
FIG. 4A is a flowchart diagram of operations for detecting languishing messages, in accordance with an embodiment of the invention.

FIG. 4A is a flowchart diagram of operations for detecting languishing messages, in accordance with an embodiment of the invention. For example, the operations to detect languishing messages are performed by the storage operating system implementing the processes described above. In operation 410, the storage operating system may receive an exemplary read operation from a client, which transmits the operation as a message. The message receipt time is timestamped by a timer process of the storage operating system and stored in memory. Then, the storage operating system initiates a load phase in operation 420 to process the message. The load phase attempts to obtain resources, such as blocks and access to volumes, in operation 430. If all necessary resources are obtained, then in operation 485, the storage operating system initiates a modify phase to perform the exemplary read operation. Thereafter, in operation 490, the read operation results in data being read or not read, subsequently completing the read operation. It should be appreciated that the read operation herein described is purely exemplary and other suitable operations for the manipulation of data are possible.

However, returning to operation 430, sometime resources cannot be obtained. In such instances, such as operation 440, the storage operating system suspends the message. Suspending the message means that the message waits on a list, such as a queue, until the resource is made available. Numerous lists may be available for a message to wait during a suspend state. When the resource is available, then message waiting on a list is restarted and leaves the list. Optimally, messages have little or no restarts. The suspended waits for resources while independently, as illustrated by FIG. 4B, the languish process checks the lists of suspended messages.

Figure 4B:
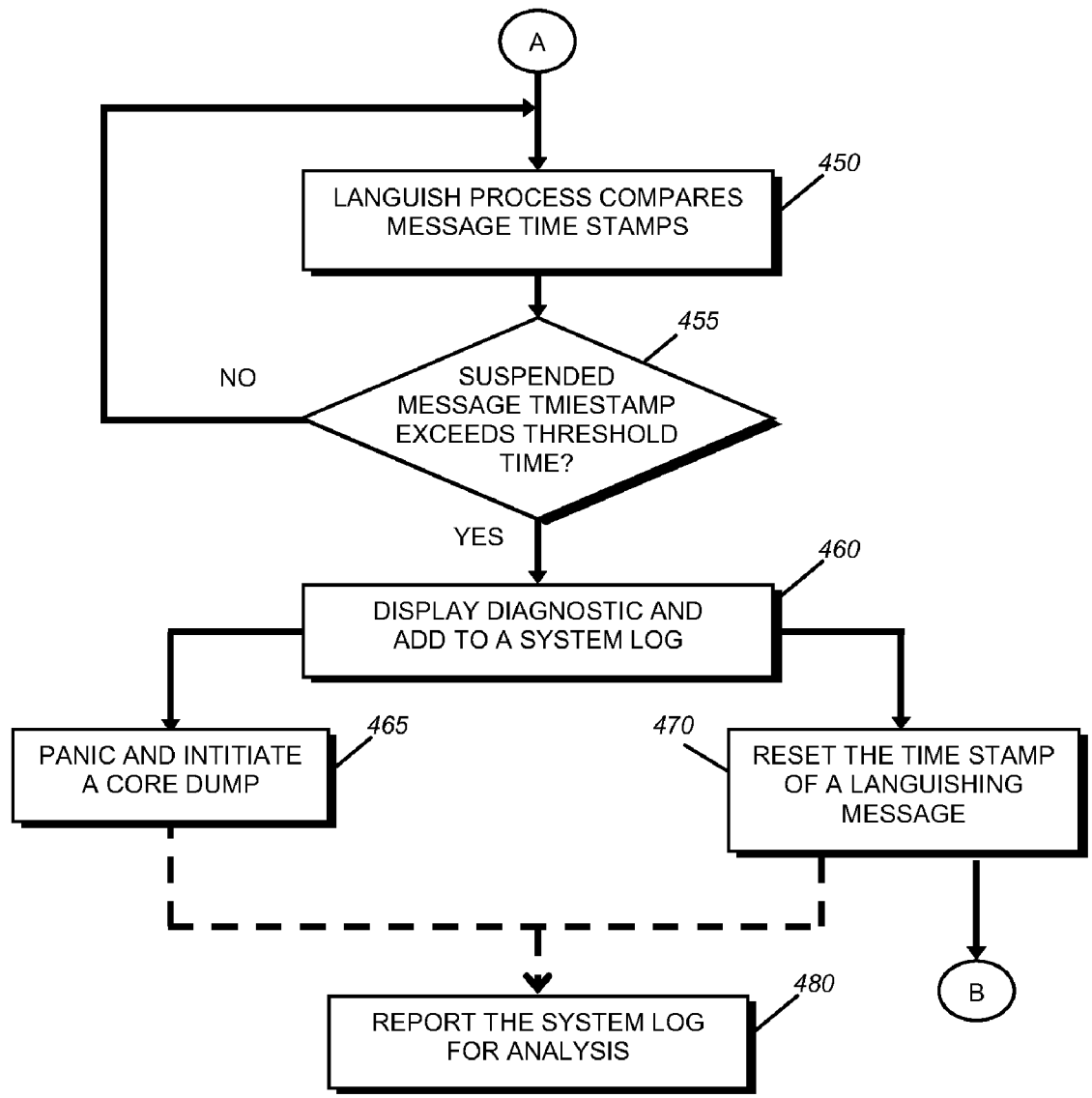
FIG. 4B is a flowchart diagram of operations for detecting languishing messages, in accordance with an embodiment of the invention.

Specifically, FIG. 4B is a flowchart diagram of operations for detecting languishing messages, in accordance with an embodiment of the invention. While messages wait on lists, the languish process compares message timestamps in operation 450. By calculating the difference between the receipt time of the message and the current time of the message, and performing a comparison operation against a threshold time, the languish process can detect whether or not the message is languishing. For example, if the message has numerous restarts without entering the modify phase or is suspended and never restarts, the message is identified as a languishing message. Thereafter, in operation 455, the languish process determines whether the suspended message timestamp exceeds a threshold time. An exemplary threshold time may be a value in seconds or fractions of a second. For example in one embodiment, the threshold time may be 30 seconds to compare all message timestamps. In another embodiment, there may be different threshold times, such as ten seconds and a tenth of second. Accordingly, depending on an attribute of a message, the message timestamp can be compared with a different threshold time. The threshold times are configurable such that a global timestamp or multiple timestamps can be established during storage system startup (i.e. booting the storage system).

Certain durations of time may be considered undesirable if a user perceives that a request has not been completed e.g. when the user expected the request to complete within a particular of period of time. If the timestamp comparison results in the determination that the message was not suspended for an undesirable amount of time, then the message waits until it restarts or until the languish process once more checks the message to detect languishing messages. If the message is languishing, then in operation 460, the storage operating system displays a diagnostic application and adds the information about the languishing message to a system log. The diagnostic application can by displayed via a command line interface (CLI) or a graphical user interface (GUI) of the management system of FIG. 1. Information related to the languishing message includes the first and second timestamps, the threshold time, the time spent languishing while suspended, the number of message restarts, and then lists the suspended message waited. Thereafter, in operation 465, the storage operating system may panic and initiate a core dump. Alternatively in operation 470, the storage operating system may reset the timestamp of the languishing message. Specifically, the receipt timestamp is set to the current timestamp. The message is thus no longer languishing and enters a load phase or once more suspends to wait for an unavailable resource, as illustrated with respect to FIG. 4A. Then, in operation 480, the storage operating system reports the system log for analysis to those users capable of analyzing the system log.

It should be appreciated that whether the panic occurs, which leads to downtime of the storage operating system or whether the message timestamp is reset, is determined by the state of the storage operating system. For example, if more than fifty percent of all messages are languishing, then the storage system can panic. Alternatively, if the message is known to require many resources, then the timestamp is reset. For example, the message attribute can include values that identify the message as requiring many resources, such as volumes, blocks, memory and inodes. Accordingly, the message may wait on many lists until all needed resources are acquired.

In embodiments of the present invention, similar types of messages that require the same unavailable resources will vie for the resource and wait. Multiple waiting time periods cause long message suspension times. Accordingly, those analyzing the system log via the management system during a post-runtime phase can prevent access to a particular resource. For example, if the resource is in high demand by multiple messages, the resource may be increased, such as the number or size of disks. In yet other alternative embodiments, the action to perform after the detection of a languishing message is to simply cease access to a particular resource after some number of messages are identified as languishing. For example, if ten messages are waiting for a particular disk that is not available, then the action is to cease access to the disk.

In exemplary embodiments of the operations described with respect to FIG. 4B, the actions include the use of administrative applications during the post-runtime phase such as an event logger, an event management system, and a trace facility system to analyze information of the languishing messages. Particularly, the system log and the core dump information can be input into the administrative applications in order to diagnose the cause of languishing messages. For example, 75% of all languishing messages may have been suspended because of an inability to access blocks from a particular disk array. Thus, based on the analysis of the information, an administrative user can add more disk arrays or take the particular disk array offline to diagnose a possible hardware problem.

In exemplary embodiments of the invention, a framework for detection languishing messages can include the pre-runtime phase, the runtime phase, and the post-runtime phase. During the pre-runtime phase, values can be configured by an administrative user for at least one threshold time and the period to execute the languish process. During the runtime phase, suspended messages are scanned according to the period and compared to a threshold time. Information related to the suspended messages that are identified as languishing messages are stored in the system log. The system log is reviewed during a post-runtime phase (e.g. during storage operating system downtime) to determine possible causes of the languishing messages. Alternatively, the system log can be reviewed during storage operating system uptime. It should be appreciated that although an administrative user can configure the values described above and can review the system log, an automated process can perform the same actions. For example, a process that receives the system log as input can analyze the system log for information related to languishing messages and recommend actions to improve the operation of the storage operating system, or perform such recommended actions itself.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for processing messages during real-time operation of a storage system, comprising:
   receiving a data access operation as a message at the storage system, the message stored in at least one of a plurality of message lists, wherein the message includes at least one of a plurality of attributes;
   initiating processing of the received message by the storage system;
   gathering, during a load phase of the data access operation in an operating system, at least one of a plurality of resources managed by the storage system, wherein the at least one of a plurality of resources permits the continued processing of the message and if the at least one of a plurality of resources cannot be gathered, the message remaining in the at least one of a plurality of message lists designated as suspended;
   identifying based at least in part on the at least one of a plurality of attributes, by a processor, a languishing message from the at least one of a plurality of message lists having messages designated as suspended during an automatic, scheduled examination of a plurality of timestamps related to each of the suspended messages wherein the languishing message is a message suspended in the load phase beyond an amount of time associated with a threshold timestamp, the suspension of the message preventing the data access operation from proceeding to a modify phase of completing the data access operation in the operating system; and
   in response to identifying the languishing message, storing diagnostic information regarding the identified languishing message.

2. The method of claim 1, wherein gathering the at least one of a plurality of resources includes determining the availability of one of a plurality of file system structures.

3. The method of claim 1, wherein identifying the languishing message further includes initiating a process to compare a first timestamp of the message with a second timestamp.

4. The method of claim 3, wherein the comparison of the first timestamp and the second timestamp is compared to at least one threshold value.

5. The method of claim 4, wherein the at least one threshold value is configurable.

6. The method of claim 1, wherein identifying the languishing message further includes causing a panic operation.

7. A storage system, comprising:
   a processor configured to execute a process, wherein the process is configured to:
      receive a data access operation as a message at the storage system, the message stored in at least one of a plurality of message lists, wherein the message includes at least one of a plurality of attributes;
      gather, during a load phase of the data access operation in an operating system, at least one of a plurality of resources managed by the storage system, wherein the at least one of a plurality of resources permits the continued processing of the message and if the at least one of a plurality of resources cannot be gathered, the message remaining in the at least one of a plurality of message lists designated as suspended;
      identify based at least in part on the at least one of a plurality of attributes, a languishing message during the real-time operation of the storage system from at least one of a plurality of message lists having messages designated as suspended during an automatic, scheduled examination of a plurality of timestamps related to each of the suspended messages wherein the languishing message is a message suspended in the load phase beyond an amount of time associated with a threshold timestamp, the suspension of the message preventing the data access operation from proceeding to a modify phase of completing the data access operation in the operating system; and
   a memory module configured to store diagnostic information regarding the identified languishing message.

8. The storage system of claim 7, wherein the languishing message is incapable of accessing the at least one of a plurality of resources.

9. The storage system of claim 8, wherein the at least one of a plurality of resources is one of a plurality of file system structures.

10. The storage system of claim 7, further comprising:
    a client system coupled to the storage system, wherein the client system is capable of communicating the message to the storage system.

11. The storage system of claim 10, wherein the message is identified as the languishing message after initiating the process.

12. The storage system of claim 11, wherein the message includes a first timestamp that is compared with a second timestamp of the storage system.

13. A storage system configured to process messages, the storage system comprising:
   a memory module including at least one of a plurality of message lists configured to store messages during real-time operation of the storage system;
   means for receiving a data access operation as a message at the storage system, the message stored in the at least one of a plurality of message lists, wherein the message includes at least one of a plurality of attributes;
   means for gathering, during a load phase of the data access operation in an operating system, at least one of a plurality of resources managed by the storage system, wherein the at least one of a plurality of resources permits the continued processing of the message and if the at least one of a plurality of resources cannot be gathered, the message remaining in the at least one of a plurality of message lists designated as suspended;
   means for identifying based at least in part on the at least one of a plurality of attributes, a languishing message from the at least one of a plurality of message lists having messages designated as suspended during an automatic, scheduled examination of a plurality of timestamps relate to each of the suspended messages wherein the languishing message is a message suspended in the load phase beyond an amount of time associated with a threshold timestamp, the suspension of the message preventing the data access operation from proceeding to a modify phase of completing the data access operation in the operating system; and
   means for storing diagnostic information regarding the identified languishing message.

14. The storage system of claim 13, further comprising:
   means for identifying the languishing message includes comparing a first timestamp of the message with a second timestamp.

15. A computer readable storage media having stored thereon computer executable program instructions executed by a processor for processing messages during real-time operation of a storage system, the computer executable program instructions comprising:
   program instructions that receive a data access operation as a message at the storage system, the message stored in at least one of a plurality of message lists, wherein the message includes at least one of a plurality of attributes;
   program instructions that initiate processing of the received message by the storage system;
   program instructions that gather, during a load phase of the data access operation in an operating system, at least one of a plurality of resources managed by the storage system, wherein the at least one of a plurality of resources permits the continued processing of the message and if the at least one of a plurality of resources cannot be gathered, the message remaining in the at least one of a plurality of message lists designated as suspended;
   program instructions that identify based at least in part on the at least one of a plurality of attributes, at a scheduled time, a languishing message from the at least one of a plurality of message lists having messages designated as suspended, wherein the languishing message is a message suspended in the load phase beyond an amount of time associated with a threshold timestamp, the suspension of the message preventing the data access operation from proceeding to a modify phase of completing the data access operation in the operating system; and
   program instructions that store diagnostic information regarding the identified languishing message.

\* \* \* \* \*

UNITED STATES PATENT AND TRADEMARK OFFICE
CERTIFICATE OF CORRECTION

PATENT NO. : 7,873,963 B1  Page 1 of 1
APPLICATION NO. : 11/257541
DATED : January 18, 2011
INVENTOR(S) : Robert L. Fair It is certified that error appears in the above-identified patent and that said Letters Patent is hereby corrected as shown below:

Correct as follows:

In Col. 11, line 21:
    corresponding ~~Mode~~ inode buffer tree. The read path on a vvol is In Col. 11, line 39:
    vvol. Finally, an indirect block or ~~Mode~~ inode file parent of the In Col. 11, line 44:
indirect block or ~~Mode~~ inode as block pointers.

Signed and Sealed this
Thirty-first Day of January, 2012

David J. Kappos
*Director of the United States Patent and Trademark Office*